(12) United States Patent
Farnsworth

(10) Patent No.: US 6,246,753 B1
(45) Date of Patent: Jun. 12, 2001

(54) AUTOMATIC MESSAGE FILING SYSTEM

(75) Inventor: Richard M. Farnsworth, Riverside, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/152,465

(22) Filed: Sep. 8, 1998

(51) Int. Cl.[7] ................................................... H04M 11/00
(52) U.S. Cl. .................................. 379/93.05; 379/108.01
(58) Field of Search .................... 379/52, 93.05, 379/93.08, 93.01, 108.01, 108.02; 178/1, 2 R, 3, 17 R, 17.5, 4.1 R

(56) References Cited

U.S. PATENT DOCUMENTS

| | | | |
|---|---|---|---|
| 4,254,462 | * 3/1981 | Raymond et al. | 379/93.01 |
| 5,450,470 | * 9/1995 | Alheim | 379/52 |
| 5,457,784 | * 10/1995 | Wells et al. | 710/9 |
| 5,499,285 | * 3/1996 | Morduch | 379/52 |
| 5,687,222 | * 11/1997 | McLaughlin et al. | 379/52 |

* cited by examiner

*Primary Examiner*—Stella Woo
(74) *Attorney, Agent, or Firm*—Michael J. McGowan; Robert W. Gauthier; Prithvi C. Lall

(57) ABSTRACT

An automated message filing system includes a teletype machine having an input for receiving data and at least one port member for enabling a bidirectional transfer of the received data. A computer is also provided having at least one port member for enabling a bidirectional transfer of data, a display, and a data storage area. A converter links the at least one port of the teletype machine with the at least one port of the computer, the converter enabling conversion of teletype data to computer data. Accordingly, data received by the teletype machine is converted by the converter into data readable and storable by the computer.

12 Claims, 2 Drawing Sheets

AUTOMATIC MESSAGE FILING SYSTEM

STATEMENT OF GOVERNMENT INTEREST

The invention described herein may be manufactured and used by or for the government of the United States of America for governmental purposes without the payment of any royalties thereon or therefor.

BACKGROUND OF THE INVENTION

(1) Field of the Invention

This invention generally relates to an automatic message filing system. More particularly, the invention relates to an automatic message filing system in which message traffic received via a submarine broadcast or the like is processed for display and long term storage.

(2) Description of the Prior Art

In present submarine communication systems, incoming data is routed from a receiver to a teletype (TTY). As data is received, the TTY prints and stores this data in memory. The TTY's memory is limited and will eventually replace old data with new data received. Therefore, the current system does not support long term message file storage. Instead, files are printed from the TTY and these paper copies are stored in a very limited space.

There are various makeshift equipment lineups and modifications currently in the fleet that make this process somewhat automated. There does not appear, however, to be any written standard configuration that documents the equipment, wiring configurations, material required or describe the software functionality to automatically process naval messages in a computer for future use and long term storage. The Automated Message Filing System (AMFS) of the present invention would resolve this long term file storage problem while providing a very efficient method of handling Naval messages.

Thus, earlier systems were not available for the intended purpose of the present invention and therefor do not address the difficulties identified above.

The following patents, for example, disclose the use of teletype machines and in some instances a computer, but do not disclose a combined system including a teletype machine linked to a computer via a converter so as to enable retrieval, dissemination and/or long term storage of data.

U.S. Pat. No. 3,166,636 to Rutland et al.
U.S. Pat. No. 3,200,192 to Auwaerter et al.
U.S. Pat. No. 3,414,888 to Gehrmann et al.
U.S. Pat. No. 3,416,140 to Cassidy, Jr. et al.
U.S. Pat. No. 3,567,858 to Ecklin
U.S. Pat. No. 3,896,381 to Wozencraft
U.S. Pat. No. 4,330,847 to Kuseski
U.S. Pat. No. 4,419,736 to Christensen et al.
U.S. Pat. No. 4,491,966 to Morecerf et al.
U.S. Pat. No. 4,520,452 to Loskorn Specifically, Rutland et al. disclose a data composer for a teletype, the device having CRT display and drum storage. No network is disclosed and no indication appears to be made as to whether the storage is long term or short term.

Auwaerter et al. disclose a system for redistribution of teletype messages. This is a logic controlled electro-mechanical system, and is not computer based as in the present invention.

Gehrmann et al. disclose a group storage for communications messages to be re-transmitted. The reference, however, does not seem to show a general purpose computer.

Cassidy, Jr. et al. disclose a magnetic recorder transmitter distributor with temporary storage of teletype messages on a magnetic drum. The device does not show long term storage.

Ecklin discloses a computer input from a teleprinter. There is no disclosure directed to communications.

Wozencraft discloses a radio-teletype coding system for tactical use. There is no disclosure of disc storage of messages.

Kuseski discloses a data communications apparatus with storing and forwarding of text. The device is not specific as to radio teletype.

Christensen e t al. disclose a teleprinter terminal with plural microprocessors. The device, however, does not appear to describe storing and forwarding of messages.

Morecerf et al. disclose a shipboard system with plural transmitters and receivers connected to computer and teletype units. Distribution of messages from a teletype to a computer is not disclosed.

Loskorn discloses a line adaptor for data communication and appears to discuss only temporary buffering, not long term storage.

It should be understood that the present invention would in fact enhance the functionality of the above patents by networking the teletype device with a computer via a converter thereby providing a simplified and structurally sound system.

SUMMARY OF THE INVENTION

Therefore it is an object of this invention to provide an automatic message filing system.

Another object of this invention is to provide an automatic message filing system in which a teletype machine is linked with a computer via a converter.

Still another object of this invention is to provide an automatic message filing system in which incoming detected data is displayed and/or stored for further processing options.

A still further object of the invention is to provide an automatic message filing system which is simple to implement and easy to use.

In accordance with one aspect of this invention, there is provided an automatic message filing system including a teletype machine having an input for receiving data and at least one port member for enabling a bidirectional transfer of the received data. A computer is also provided having at least one port member for enabling a bidirectional transfer of data, a display, and a data storage area. A converter links the at least one port of the teletype machine with the at least one port of the computer, the converter enabling a bidirectional conversion of teletype data with computer data. Accordingly, data received by the teletype machine is converted by the converter into data readable and storable by the computer.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

In general, the present invention is directed to an automated message filing system in which incoming messages are downloaded off of a teletype machine and input into a computer. A reverse situation is also available whereby the computer is able to supply an approved outgoing message to the teletype machine for dissemination.

Advantages of the inventive automated message filing system include the ability to implement a paperless message management system on board a ship or in any comparable situation where incoming messages are intercepted by a teletype machine and outgoing messages are sent by a teletype machine. The method will dramatically increase the efficiency of shipboard and other similar communications. In addition, the method is very inexpensive to implement due to utilization of current shipboard equipment including the teletype and computer.

Figure 1:
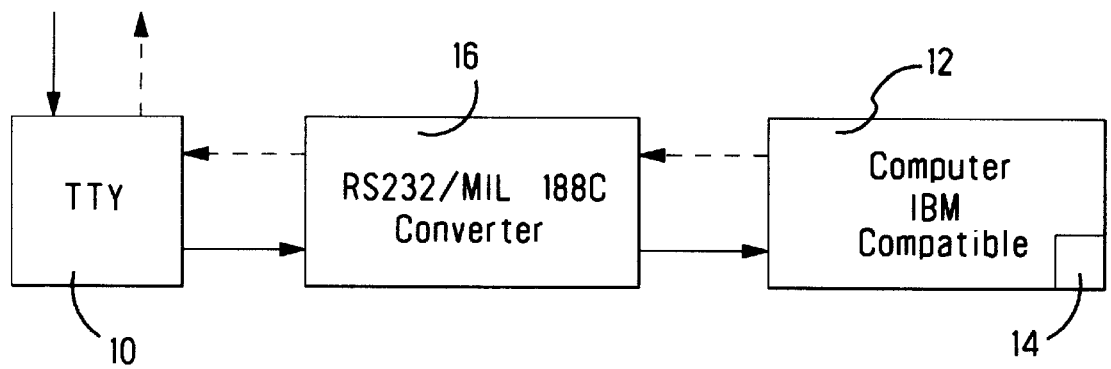
FIG. 1 is a block diagram of a basic signal flow for an automatic message filing system according to a preferred embodiment of the present invention.
Figure 2:
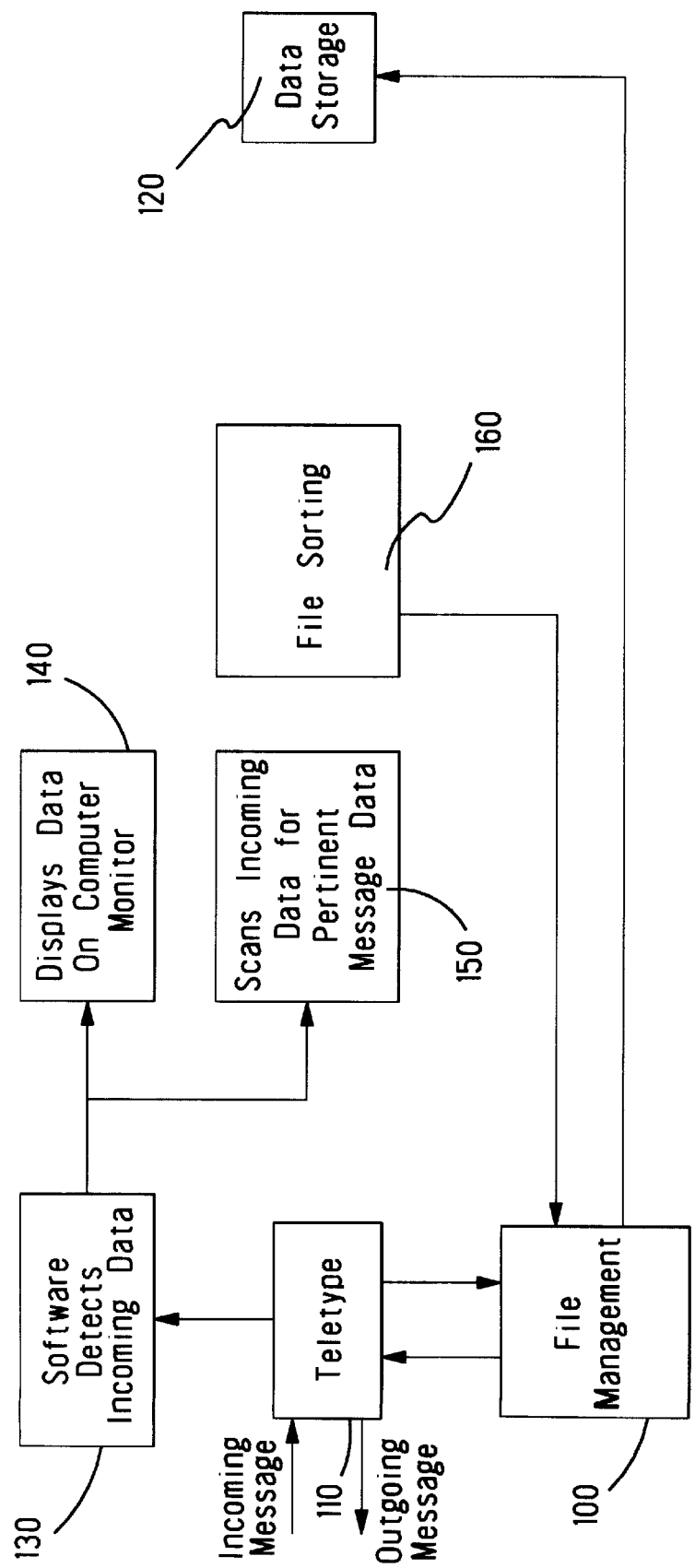
FIG. 2 is a block diagram of basic computer functions for the system shown in FIG. 1.

Referring now to FIGS. 1 and 2, the automated message filing system is best illustrated by the use of block diagrams as shown and includes a teletype machine 10 and a computer 12 with a monitor 14 as basic components of the system. In order to convert data received by the teletype machine 10 into compatible data for the computer 12, a converter 16 is disposed to receive data from the teletype machine 10 and convert the data prior to input into the computer 12.

By way of example, the computer 12 is shown as an IBM compatible computer which utilizes a Windows '95 or Windows 3.1 operating system, as manufactured by Microsoft Corporation. The converter 16 is shown as an RS232/MIL 188C converter. The selection of the converter is intended to be compatible to the teletype machine 10 being used, in this instance, the teletype machine 10 processes a MIL-STD-188C signal, thus requiring selection of a compatible converter. In the development of computer software, hardware, teletype machinery, and the like, it should be understood that variations and modifications may be made to the equipment illustrated herein and those advancements in the industry are intended to be included within the scope of this invention.

The basic signal flow for the automated message filing system is shown in detail in FIG. 1. In particular, incoming data, represented by solid lines, is received by the teletype machine 10. The teletype machine 10 includes a message forward (MSG FWD) function which automatically routes data to the converter 16. At the converter 16, the MIL-188C signal is converted to a RS232C signal and then routed to a port on the rear of the computer 12. The particular connections will be described in further detail in association with FIG. 3.

Outgoing data, represented by dotted lines, is sent from computer 12 to converter 16 where the RS232C signal is converted to a MIL-188C signal. The signal is then routed to teletype machine 10 for transmission. At the time of receiving incoming data or as data is retreived from computer 12 for transmission, the computer 12 displays the data on monitor 14.

Referring now in detail to the flow diagram of FIG. 2, the sequence of events is best described as a series of steps shown in FIG. 2, though the diagram is not of a conventional flow chart model. Any data in the form of files can be retrieved at step 100 for printing, copying, transmission, deletion, or other file management functions. Data being processed for transmission is passed to the teletype at step 110 and data may also be stored for later use or long term storage at step 120.

A primary purpose, of course is the automated processing of an incoming message. In that instance, the data is received into the teletype machine 10 at step 110. The software of the computer 12 detects incoming data at step 130. The data received by the computer 12 at step 130 may either be directly displayed on the computer monitor 14 at step 140, scanned for pertinent message data at step 150 or both displayed and scanned. Once the messages have been displayed and/or scanned, the incoming data is sorted into appropriate files at step 160 and forwarded to step 100 for performance of file management functions such as storage at step 120. As shown in the diagram, the incoming message or data can also be immediately stored as data files at step 110 without processing the same through the software at steps 130 through 160.

In addition to the receive function, the automated message filing system is capable of transmitting data, represented by the dotted lines in FIG. 1. When an outgoing message has been completed, a radio operator can use the file management function of the software of the computer 12 at step 100 to extract an ASCII formatted message from a disk, and route the signal to the desired teletype machine 10 via the converter 16. When the message is in the teletype machine 10, the message can then be routed by conventional means to a transmitter (not shown) for transmission.

Figure 3:
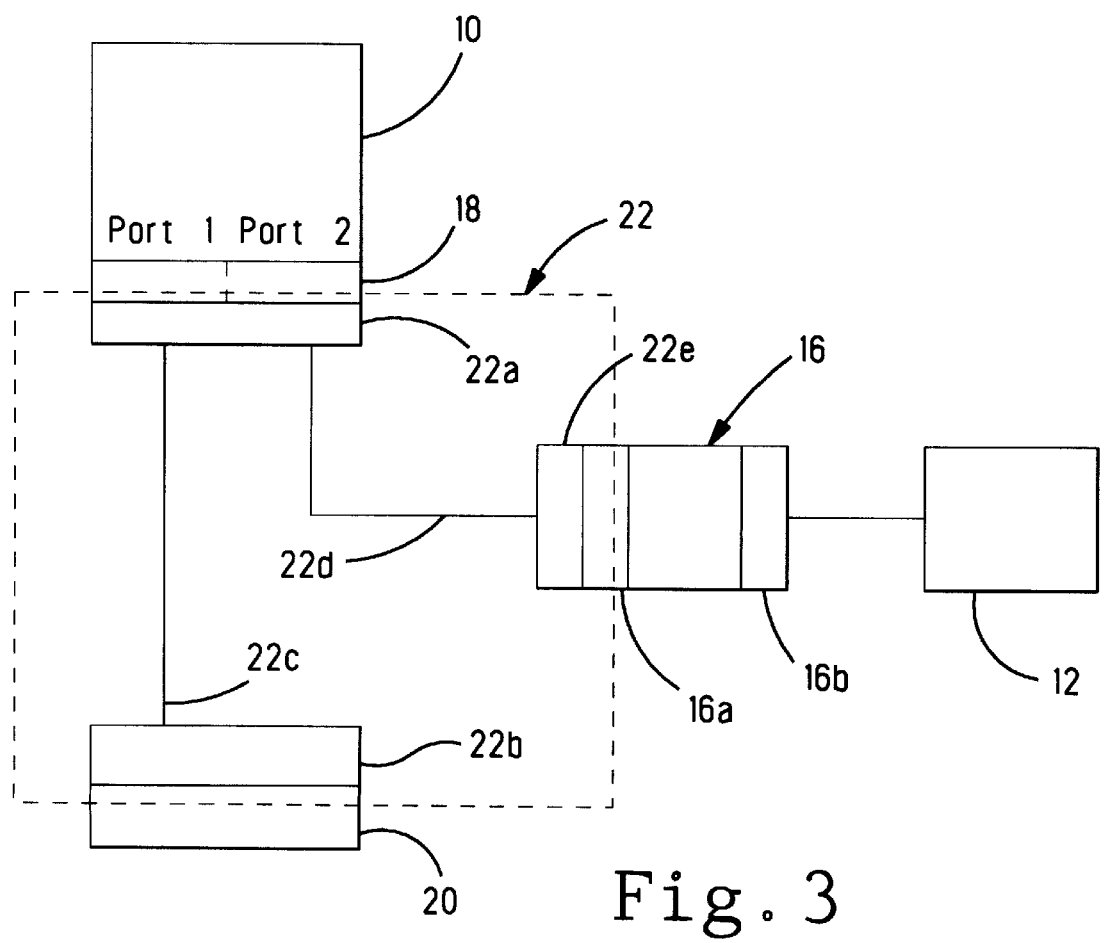
FIG. 3 is a hardware wiring diagram for use with the present invention.

Referring now to the hardware wiring diagram of FIG. 3, the teletype machine 10 processes an MIL-STD-188C signal as explained. Teletype 10 has DB25 female connector 18 which, in the prior art, would be connected directly to DB25 male I/O connector 20. Connector 18 supports two data ports. Port 1 allows for normal I/O connection and Port 2 allows for message forwarding, e.g., forwarding messages to or from another teletype. To implement the current invention, Y-cable 22 is inserted between connectors 18 and 20. Y-cable 22 has mating connectors 22a and 22b which mate with connectors 18 and 20, respectively. Leg 22c of Y-cable 22 connects Port 1 to I/O connector 20. Leg 22d of Y-cable 22 connects Port 2 to converter 16 first I/O connector 16a via third mating connector 22e. Computer 12 connects to second I/O connector 16b of converter 16.

The teletype machine 10 processes incoming data from a receiver via TTY Port 1. Using the TTY's message forward (MSG FWD) function, the incoming data is sent out TTY Port 2, and then routed through the converter 16 to change the MIL-188C signal to RS232C. The computer 12 receives the RS232C signal where it is processed by the software.

The software monitors each character as it is received by the computer 12 for specific information pertinent to naval messages, i.e., Start of Message (SOM), End of Message (EOM) and Classification. The computer will then file all messages classified as SECRET and below to a hard disk. If a TOP SECRET message is detected, the software user is prompted to delete it or save it to a floppy diskette.

The messages that are saved can be retrieved for printing, deleting, viewing, electronic copying to diskette, and other file manipulation functions well known in the computer art. If there is a network available, the messages can be placed on a network for paperless dissemination of the message files.

There is also the capability to electronically transfer ASCII formatted outgoing messages from the computer 12 to teletype machine 10. Messages that are to be transmitted from the ship can be drafted on a computer, routed for editing on a diskette or LAN, transferred from the computer 12 to the teletype machine 10 via the converter 16 and transmitted. This capability is a very efficient way of preparing messages for transmission and dissemination since word processing software, standard with typical computers, can be used to draft the messages.

Accordingly, as the incoming data (represented by solid lines in FIG. 1) is received by the teletype machine 10, using the teletype machine 10's message forward function, the data is automatically routed to the converter 16 where the MIL-188C signal is converted to RS232C and then routed to the computer 12. At this point the software detects the incoming data and displays it on the computer monitor. When the end of message (EOM) is detected, the software automatically files this message to the computers hard disk. In addition to the receive function, the automated message filing system is also capable of transmitting data (represented by dotted lines as shown in FIG. 1). When an outgoing message has been approved for release by the Commanding Officer, the radio operator can use the software to extract the ASCII formatted message from disk, route the signal to the desired TTY via the RS232C, to the MIL-88C converter. When the message is in the TTY, the message can then be routed by conventional means to a transmitter for transmission.

An advantage of the invention is the ability to simplify dissemination and storage of data incoming over a teletype machine, in whatever environment the teletype machine is used.

By the present invention, automated message retrieval in a paperless environment with extended storage capabilities is conducted in a manner not previously conceived in the art, and as a result the system has a wide range of uses and implementation potential. In particular, it should be appreciated that the invention need not be limited to shipboard use, but may be used in virtually any environment where there is a teletype machine, converter, and computer available for linking as described. The disclosure directed to the Navy and shipboard use is by way of example only.

This invention has been disclosed in terms of certain embodiments. It will be apparent that many modifications can be made to the disclosed system and apparatus without departing from the invention. Therefore, it is the intent of the appended claims to cover all such variations and modifications as come within the true spirit and scope of this invention.

What is claimed is:

1. An automatic message filing system comprising:
   a teletype machine;
   a computer having at least one port member for enabling a bidirectional transfer of data, a display, and a data storage area;
   a converter enabling at least conversion of teletype data to computer data, wherein data received by said teletype machine is converted by said converter into data readable and storable by said computer; and
   a connector configured for attachment to both an input port and a message forwarding port of the teletype machine, the connector enabling bi-directional transfer of data at the input port of the teletype machine and enabling a bi-directional transfer of data with the converter at the message forwarding port of the teletype machine.

2. The system of claim 1 wherein the connector further comprises:
   a single cable connector mating with both the input port and the message forwarding port of the teletype machine;
   an input/output cable connector mating with an input/output device;
   a message forwarding cable connector mating with the converter;
   a first cable portion connecting the single cable connector to the input/output cable connector at the input/output device; and
   a second cable portion connecting the single cable connector to the message forwarding cable connector at the converter.

3. The system of claim 1 wherein said converter is an RS232/MIL-188 signal converter.

4. The system of claim 1 wherein the computer stores the messages as files in a word processing format.

5. The system of claim 4 wherein the stored messages files are delineated by Start of Message and End of Message teletype data.

6. The system of claim 4 wherein a storage medium for the message files is determined by classification teletype data.

7. The system of claim 6 wherein the storage medium is one of a floppy diskette for TOP SECRET classification data and a hard disk for other than TOP SECRET classification data.

8. A method for automatic filing of a message received at a teletype as computer data, the method comprising:
   providing a dual-port connector for bi-directional communication between an input/output device and the teletype and between the teletype and a converter;
   receiving the message at an input/output port of the teletype from the input/output device;
   forwarding the message through a message forwarding port of the teletype to the converter;
   converting the message at the converter from a teletype data format to a computer data format; and
   storing the converted data in a computer as message files in a word processing format.

9. The method of claim 8 wherein said storing further comprises:
   scanning the data to intercept predetermined teletype codes;
   delineating the files by Start of Message and End of Message teletype codes; and
   categorizing the files according to a classification teletype code.

10. The method of claim 9 wherein said categorizing comprises:
    storing the files to a floppy diskette when the classification teletype data is TOP SECRET; and
    storing the files to a hard disk when the classification teletype data is other than TOP SECRET.

11. The method of claim 8 wherein said stored data is retrievable for a selected one of at least printing, deleting, viewing, electronic copying to diskette, and file manipulation functions.

12. The method of claim 8 further comprising the step of electronically transferring stored messages from said computer to said teletype.

* * * * *